United States Patent [19]

Davies et al.

[11] Patent Number: 6,003,083

[45] Date of Patent: Dec. 14, 1999

[54] WORKLOAD MANAGEMENT AMONGST SERVER OBJECTS IN A CLIENT/SERVER NETWORK WITH DISTRIBUTED OBJECTS

[75] Inventors: Kenneth Edward Davies, Eastleigh, United Kingdom; Donna Ngar-Ting Dillenberger, Yorktown Heights, N.Y.; Glyn Normington, Winchester, United Kingdom

[73] Assignee: International Business Machines Corporation, Armonk, N.Y.

[21] Appl. No.: 09/025,904

[22] Filed: Feb. 19, 1998

[51] Int. Cl.[6] .................................................. G06F 13/00
[52] U.S. Cl. .......................... 709/226; 709/104; 709/303
[58] Field of Search .................................... 709/102, 104, 709/105, 106, 107, 203, 219, 223, 226, 300, 302, 303, 304; 707/10, 103, 104

[56] References Cited

U.S. PATENT DOCUMENTS 5,440,744  8/1995  Jacobson et al. .
5,790,425  8/1998  Wagle ..................................... 709/218
5,799,149  8/1998  Brenner et al. .......................... 709/201
5,925,098  7/1999  Freund et al. ........................... 709/203

FOREIGN PATENT DOCUMENTS

0677943A2  10/1995  European Pat. Off. ........ H04L 29/06

OTHER PUBLICATIONS

U.S. Patent application No. 08/853,102, filed May 8, 1997.
eNetwork Dispatcher User's Guide Version 2.0 for Solaris, Windows NT, and AIX IBM Publication No.: GC31-8496-02.

*Primary Examiner*—Ahmad F. Matar
*Assistant Examiner*—V Vu
*Attorney, Agent, or Firm*—Edward H. Duffield

[57] ABSTRACT

A group of object servers configured for workload management is described wherein the group exports an object reference to clients that may want to call the group in order to perform some work. The object reference has a field which points to a workload management unit which performs workload management among the group at the Internet Protocol (IP) level.

12 Claims, 5 Drawing Sheets

WORKLOAD MANAGEMENT AMONGST SERVER OBJECTS IN A CLIENT/SERVER NETWORK WITH DISTRIBUTED OBJECTS

FIELD OF THE INVENTION

The present invention relates to the field of client/server (also known as "distributed") computing, where, for example, one computing device ("the client") requests another computing device ("the server") to perform part of the client's work.

BACKGROUND OF THE INVENTION

Client/server computing has become more and more important over the past few years in the information technology world. This type of distributed computing allows one process (a "client") running on a machine to delegate some of its work to another process (a "server") running on another machine that might be, for example, better suited to perform that work. The client and server might also be two processes running on the same physical machine.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example, of the basic architecture will be given below for contextual understanding of the invention's environment. In this example, the client and server are on different machines, but, the same software architecture applies if they are on the same machine.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of finding and establishing the necessary communications with the second computer 20 with reference to definitions of the available communications services stored in the storage device 60. All the possible services are defined as a cohesive framework of object classes 70. During this process, the first logic means determines an object reference which has one component (the server address) identifying the server computer 20 and another component (the object key) identifying the particular server object located on server computer 20. Defining the services in this way gives rise to a great number of advantages in terms of performance and reusability.

To establish the necessary communication with the server 20, the first logic means 50 determines which object class in the framework needs to be used, and then creates an instance of that object, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms as is shown in FIG. 1. The OMG has set forth published standards by which clients (e.g. 10) communicate (in OOP form) with servers (e.g. 20). As part of these standards, an Object Request Broker has been defined (known as the Common Object Request Broker Architecture, or CORBA for short), which provides the object-oriented bridge between the client and the server. The ORB decouples the client and server applications from the object oriented implementation details, performing at least part of the work of the first and second logic means 50 and 90 as well as the connection means 80.

Oftentimes, duplication of server resources (in the form of plural servers) is provided to enable "the server" to handle a large number of simultaneous client requests and to provide for fault tolerance (if one server is defective another can "step in" and take over). The clients think they are communicating with a single "server", but in fact, a plurality (or group) of servers is actually handling the requests (these servers could be located on separate machines, or they could be separate processes running on the same machine). In this context, client requests destined for "the server" are directed to a central gateway (common to all of the server machines making up "the server") which performs workload management and load balancing to distribute client requests to the various servers in the group according to any well-known workload balancing policy (or combination of a plurality thereof), such as the round robin by method policy, where each server is assigned a request in turn. The current workload of each server in the group is also a common factor used in scheduling a new request (i.e., a new request is assigned to a server with a low current workload). The specific details of the balancing policy/policies to be used are selected by the person configuring "the server" system architecture, typically a systems administrator.

As part of the CORBA standard, a protocol for communication amongst ORBs is defined, known as the General Inter-Orb Protocol (GIOP). This protocol is basically a list of messages which a client ORB and a server ORB can send to each other. When the Internet is used as the transport medium between the client ORB and the server ORB, a mapping is required from the GIOP to the TCP/IP level (which is the basis for Internet traffic). This mapping is known as the Internet Inter-Orb Protocol (IIOP).

Heretofore, all known workload management gateways, such as those described above, have carried out the workload management policies at the IIOP level. That is, the IIOP gateway receives client requests from the client ORB and then proceeds to assign a server in the server group to the request, all at the IIOP level. Once the IIOP gateway has selected a server in the group, the gateway must then form another IIOP request in order to forward this request on to the selected server. The IIOP gateway must, therefore, marshall and demarshall the parameter list included in each client request in order to redirect an incoming client request to a selected server, thus requiring a high level of work to be necessary at the gateway. This slows up the overall system performance and results in an inefficient design.

IBM's Component Broker Series (a trademark of IBM) product released in September 1997 involved adding extra functionality to the client ORB in order to enable workload management to be carried out amongst a group of object servers, and to thus, for the clients with the added functionality, do away with the need for passing requests through a gateway router. See, U.S. patent application Ser. No. 853,102, filed May 8 1997. However, this approach is only usable by the clients that have the extra functionality installed and is thus not capable of being used in an environment where a broad range of clients are involved. Clients without the added functionality still have to send their requests through an IIOP router in this IBM product.

Thus, there is a need in the prior art for a way of allowing a broad range of clients to access the resources of a workload managed server group in a more efficient way.

SUMMARY OF THE INVENTION

According to a first aspect, the present invention provides a method of performing workload management amongst a group of server objects within an object-oriented client/server computing environment, the method including steps of:

receiving a client request;

accessing a pointer previously exported by the group of servers, the pointer pointing to a workload management unit;

performing workload management using the workload management unit on the client request in order to select which server of the group should be used to satisfy the request, the workload management taking place at the Internet Protocol (IP) level; and forwarding the client request to the selected server.

Preferred features are as follows. The pointer is an object reference which has a hostname field which contains the name or IP address of an IP router acting as the workload management unit. Alternatively, the pointer is an object reference which has a hostname field which contains an identifier identifying the group of servers, the identifier being recognized by a dynamic domain name server acting as the workload management unit.

According to a second aspect, the present invention provides a group of object servers configured for workload management wherein the group exports an object reference to clients that may want to call the group in order to perform some work, the object reference having a field which points to a workload management unit which performs workload management among the group at the Internet Protocol (IP) level.

According to a third aspect, the present invention provides a computer program product stored on a computer readable storage medium for, when run on a computer, carrying out a method according to the first aspect described above.

According to a fourth aspect, the present invention provides an apparatus for performing workload management amongst a group of object servers within an object-oriented client/server computing environment, the apparatus comprising:

means for receiving a client request;

means for accessing a pointer previously exported by the group of servers, the pointer pointing to a workload management unit;

means for performing workload management using the workload management unit on said client request in order to select which server of the group should be used to satisfy the request, the workload management taking place at the Internet Protocol (IP) level; and means for forwarding the client request to the selected server.

By performing workload management at the IP level, requests can be sent to the selected object server in the server group very quickly and efficiently, as the amount of processing involved to marshall and demarshall the parameter list in each client request is kept to a minimum. Further, no extra software need be added to the client in order to carry out such efficient workload management.

BRIEF DESCRIPTION OF THE DRAWINGS

The invention will be better understood by the following detailed description of the preferred embodiments which is presented by referring to the following drawing figures.

DETAILED DESCRIPTION OF THE PREFERRED EMBODIMENTS

Figure 1:
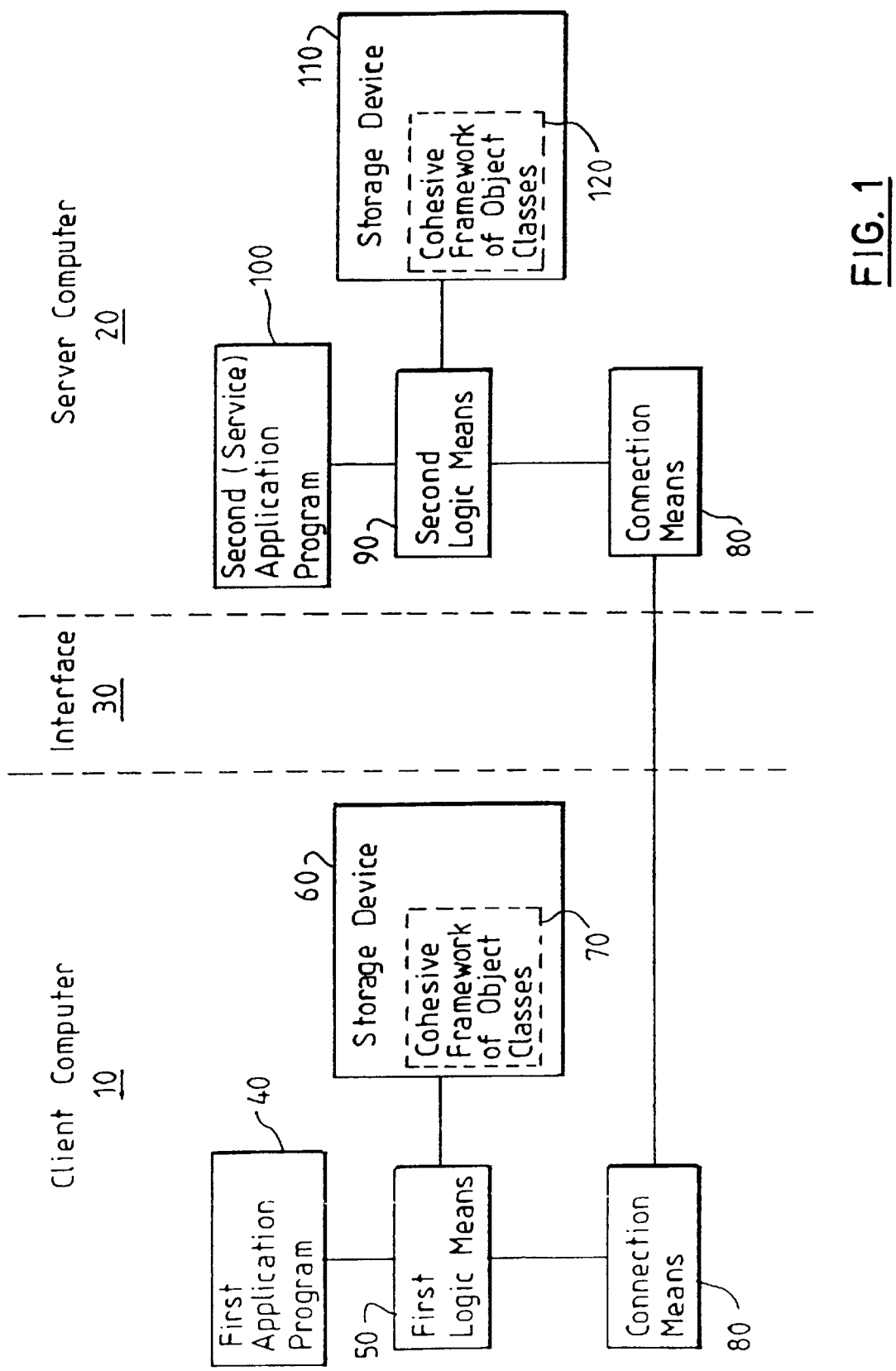
FIG. 1 is a block diagram of a well-known heterogeneous client/server architecture using object technology, in the context of which the present invention can be applied.
Figure 2:
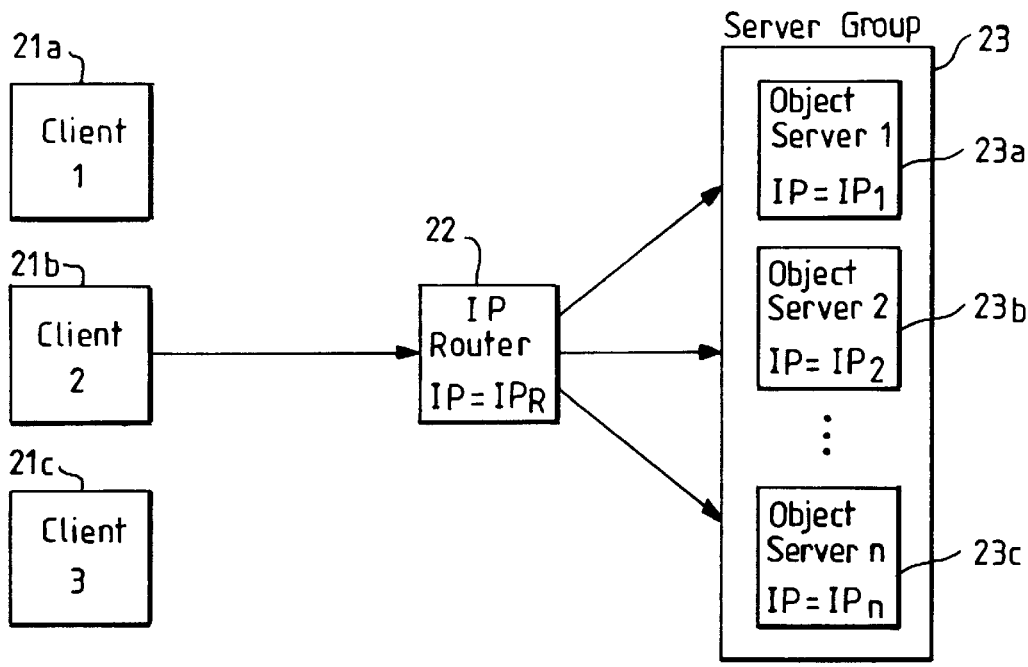
FIG. 2 is a block diagram showing the software elements of a first preferred embodiment of the present invention.

The server group 23 of the first preferred embodiment of FIG. 2 contains a plurality of object servers 23a–23c, each of which is provided for serving client requests, as explained above. The clients 21a, 21b and 21c of FIG. 2 are similar to the client shown in FIG. 1, in that each has an application layer, a proxy object and an ORB layer (the latter two elements correspond to the elements 50, 60, 70 and 80 of FIG. 1). In this prior art configuration of FIG. 1, when the first application program 40 wished to have a server do part of its work, it sent a message specifying what it wanted done to the proxy object. The proxy object finds an object reference (which was previously exported from a server) from the request and passed this object reference to the ORB which used the server address included within the object reference to route the request to the server. The object reference also includes the object key, which identifies which object the server should invoke to process the client request.

In FIG. 2, when a group of object servers 23a–23c are to be treated as a group of objects for workload management purposes, a workload balanced attribute is associated with a class which is recorded when the class is installed in the server. The attribute is a boolean value which determines whether or not objects of the class are suitable for workload balancing. For example, an IDL (Interface Definition Language) interface WorkloadBalanced could be defined from which classes of objects that must be workload balanced must inherit. When an object reference is being exported from a server ORB to client ORBS, the server ORB checks whether the associated object belongs to a class that is configured as suitable for workload management (balancing). If it does not, then the object reference is exported according to normal procedures. However, if it does, the object reference must be exported with an IIOP profile containing certain values in certain fields as will be described below.

Figure 4:
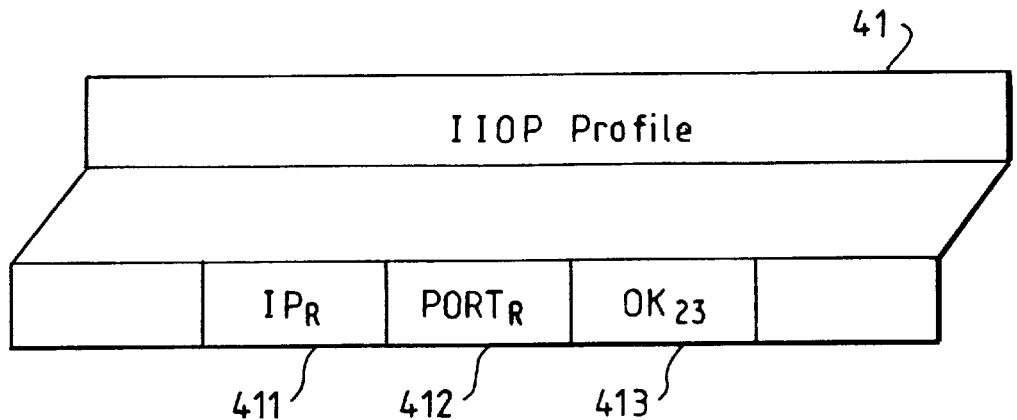
FIG. 4 is a diagram showing some of the fields of the IIOP profile of an object reference according to the first preferred embodiment of FIG. 2.

In FIG. 2, the server group 23 exports an interoperable object reference (IOR) to each client 21a–21c so that the clients will know how to contact the server group in order to make a request thereof. As shown in FIG. 4, the exported IOR contains an IIOP profile 41 which has a hostname field 411 that includes the IP address of a server process containing an IP router 22 (commonly known as an IP sprayer). Alternatively, the hostname field 411 could include a name for the server group (e.g., SG1.1) which the client could then resolve into the IP address of the IP router 22 by accessing a standard Domain Name Server (DNS). The IIOP profile 41 also has a port number field 412 containing the port number to which the IP router 22 will use to "listen" for incoming IIOP requests. Further, IIOP profile 41 has an object key field 413 containing an identifier identifying the server group (so that the server group is able to recognize object keys it has previously exported and hence construct local objects for them as opposed to constructing proxies to objects exported by other server groups).

Then, when a client 21b's ORB makes a request to the server group 23, the client ORB first contacts the server process containing the IP router 22 located at $IP_R$ (as this is the server process pointed to by the object reference). IP router 22 then uses workload management policies (as described above) to make a decision as to which object server in the group should be selected to serve this particular client request. This workload management decision takes place at the TCP/IP level. That is, the IP router 22 looks at the IP addresses ($IP_1$ to $IP_n$) for each object server 1-$n$ in the server group 23, makes a workload management decision to select a particular object server in the server group and then simply forwards on the request from $IP_R$ to the IP address of the selected object server. The router 22 performs workload balancing amongst the IP addresses of the various object servers in the server group 23.

The network dispatcher function of IBM's Interactive Network Dispatcher (described in *Interactive Network Dispatcher User's Guide,* IBM publication GC31-8496-00) can be used for the IP router 22, with workload information concerning each object server in the server group being provided by ISS (interactive session support) workload monitoring agents. An ISS workload monitoring agent could run on each of the machines containing an object server. The agents issue configurable commands to determine the workload of the machine. For example, the agents can determine the CPU usage of the machine on which it is running and/or the number of long-lived connections that have been made to the server. The IP router 22 uses this collected workload data in order to make its decisions regarding which object server in the group to select at any particular time. Further, Interactive Network Dispatcher's IP router can be configured to have a "sticky" port so that all requests from a given client IP address are redirected to the same server.

Figure 5:
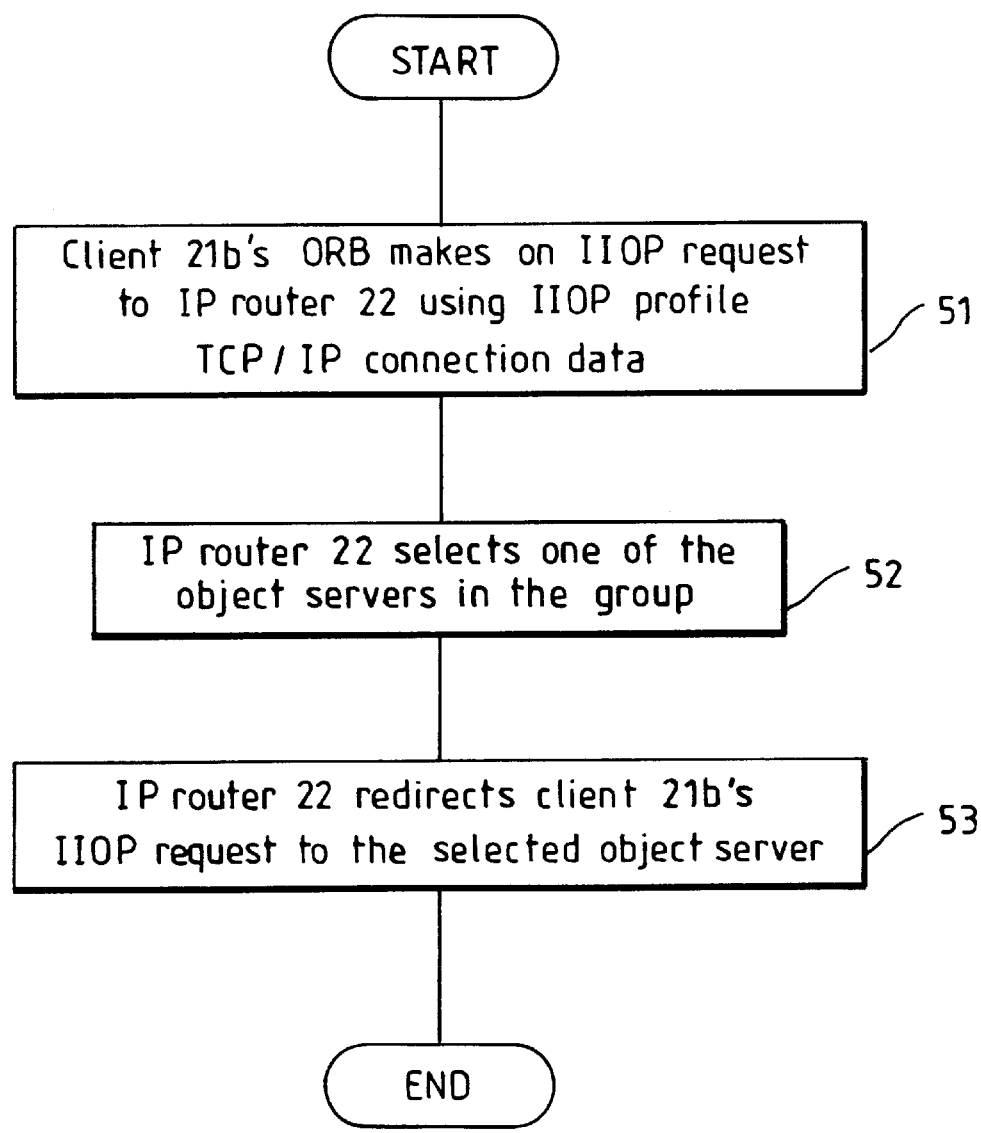
FIG. 5 is a flowchart showing the steps taken during operation of the first preferred embodiment of FIGS. 2 and 4.

The steps involved in performing workload management among a group of server objects will now be described in conjunction with the flowchart of FIG. 5. In this example, client 21b is making a request to the server group 23.

At step 51, client 21b's ORB accesses the IIOP profile 41 of the IOR previously exported to client 21b by the server group 23. In field 411 of this IIOP profile 41, the client 21b's ORB determines that the IP router 22 is located at IP address $IP_R$ and that the IP router 22 is listening for IIOP requests on $PORT_R$. Thus, the client 21b's ORB forms an IIOP request and sends it to the IP router 22 using this TCP/IP connection information which it learns from the IIOP profile 41.

When the IP router 22 receives the request, it uses workload management data to select one of the object servers 23a to 23c in the group 23 (step 52). Then, IP router 22 redirects the client 21b's IIOP request to the IP address of the selected object server (step 53). The selected object server would then use the object key $OK_{23}$ in the object key field 413 in order to identify the particular object on this selected object server which is to be invoked (this is the object on this object server that is a member of the group 23 that exported the object reference shown in FIG. 4).

Since the server group identifier is included in the object key of the group of workload manageable objects, the selected server can determine that the object was exported by a member of the server group and therefore create or activate a local object rather than a proxy to a remote object.

It should be noted that, in this first embodiment, once the IP router 22 has selected one of the servers in the server group 23, the IP router 22 does not have to form a request at the IIOP level in order to forward on this request to the selected server. The IP router 22 instead simply redirects the client request to the IP address of the selected server without having to further process the request to bring it up to the IIOP level. Communication between the IP router 22 and the selected server is at the IP level. This results in a very quick and efficient re-routing of an incoming IIOP client request. Once the connection to the selected server has been established, IIOP requests are redirected to this server for the lifetime of the connection.

Figure 3:
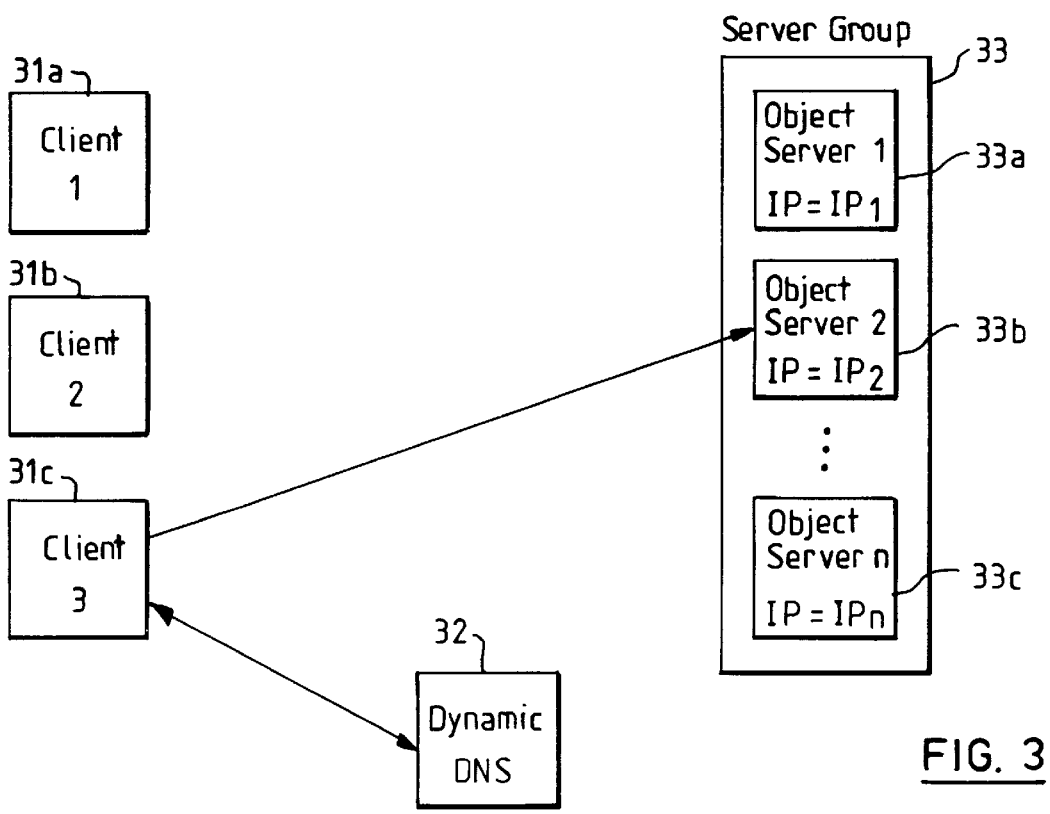
FIG. 3 is a block diagram showing the software elements of a second preferred embodiment of the present invention.

In the second preferred embodiment of FIG. 3, when the server group's ORB exports an IOR which requires workload management, the IOR points the requesting client to a dynamic domain name server (DNS) 32 which will perform the workload management.

Figure 6:
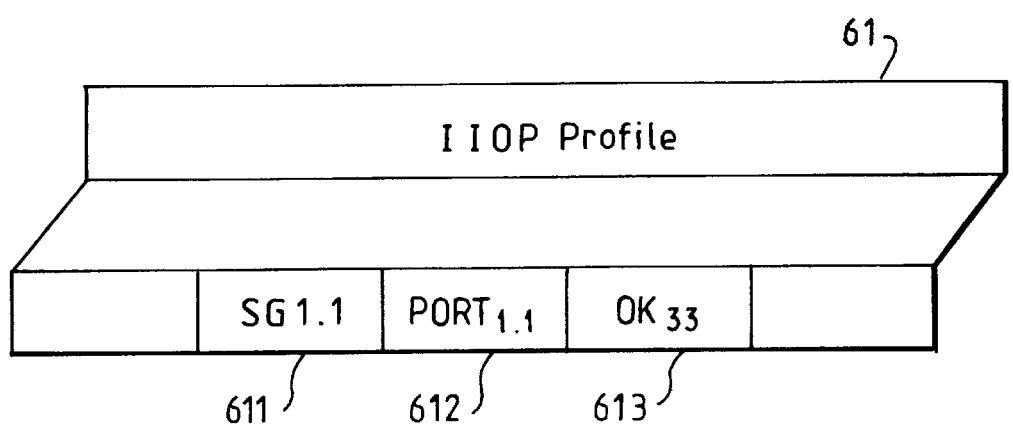
FIG. 6 is a diagram showing some of the fields of the IIOP profile of an object reference according to the second preferred embodiment of FIG. 3.
Figure 7:
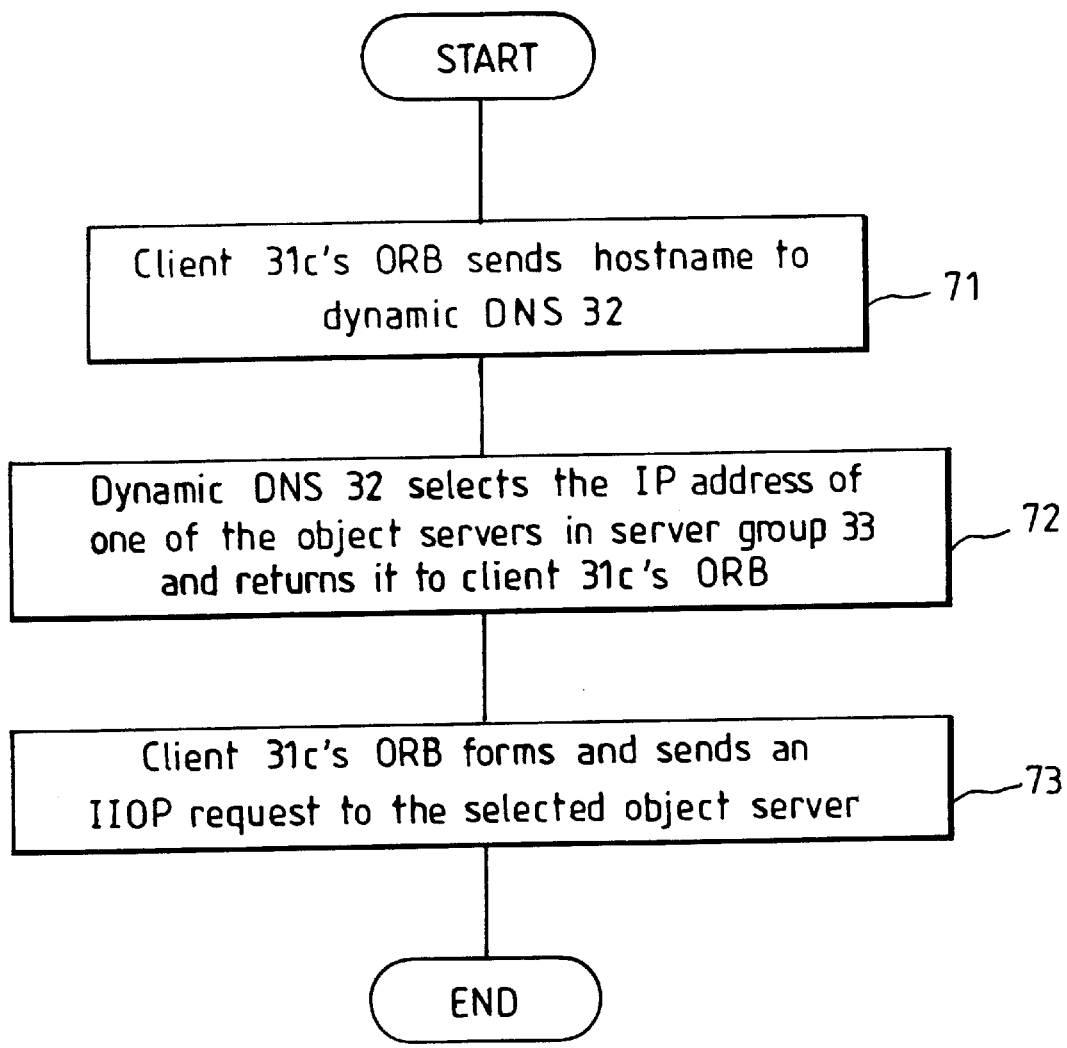
FIG. 7 is a flowchart showing the steps taken during operation of the second preferred embodiment of FIGS. 3 and 6.

Specifically, the IOR's IIOP profile 61 of FIG. 6 contains a hostname in field 611 identifying the server group (e.g., SG1.1), a port number field 612 specifying a port number to be used during connection to a server and an object key field 613. When a client 31c's ORB wants to send a request to the server group 33, the IOR of FIG. 6 is accessed. Because a hostname (rather than an IP address) is stored in field 611, the hostname SG1.1 is sent by the ORB to the dynamic DNS 32 (step 71 of the flowchart of FIG. 7, where the operation of the second preferred embodiment is shown). Dynamic DNS 32 takes the hostname of the server group 33 and resolves it to a dynamic choice of one of the IP addresses ($IP_1$ to $IP_n$) of one of the object servers in the server group 33 (step 72). That is, workload management is carried out within the dynamic DNS 32 by considering the IP addresses of each object server in the server group 33 and selecting one of them.

More specifically, a normal DNS will accept a hostname as an input and always provide the same IP address as an output. However, a dynamic DNS will take a hostname as an input and find a plurality of IP addresses stored under that hostname (one IP address for each server in the server group). The dynamic DNS considers each of these IP addresses and, according to a chosen workload management policy (or policies), selects one of the IP addresses to output back to the client 31c's ORB. IBM's Interactive Network Dispatcher's Interactive Session Support (ISS) function can be used as the dynamic DNS.

Once the client 31c's ORB has received the IP address of the selected server 33b, the client 31c forms an IIOP request and sends it to the object server 33b using the port number $PORT_{1.1}$ specified in field 612 of the IIOP profile of the IOR (step 73). The selected object server would then use the object key $OK_{33}$ in the object key field 613 to identify the particular object on this selected object server which is to be invoked (this is the object on this object server that is a member of the group 33 that exported the object reference shown in FIG. 6).

It should be noted that, in this second embodiment, there is only one request flow which must take place at the IIOP level, and this is the request flow from client 31c to server 33b. Communication between the dynamic DNS 32 and the client 31c is at the IP level. This results in a very quick and efficient assignment of a client request to a workload balanced choice of servers in a server group. Once the connection to the selected server has been established, IIOP requests are redirected to this server for the lifetime of the connection.

The two embodiments described could be combined together by placing multiple IP routers behind a dynamic DNS. The IP routers would in turn be placed in front of a common set of backend servers.

What is claimed is:

1. A method of performing workload management amongst a group of object servers within an object-oriented client/server computing environment, said method including steps of:

receiving a client request;

accessing a pointer previously exported by the group of servers, said pointer pointing to a workload management unit;

performing workload management using said workload management unit on said client request in order to select which server of said group should be used to satisfy the request, said workload management taking place at the Internet Protocol (IP) level; and forwarding said client request to the selected server.

2. The method of claim 1, wherein said pointer is an object reference.

3. The method of claim 2, wherein said object reference has a hostname field which contains the name or IP address of an IP router.

4. The method of claim 2, wherein said object reference has a hostname field which contains an identifier identifying said group of servers.

5. The method of claim 1, wherein said workload management unit is an IP router.

6. The method of claim 1, wherein said workload management unit is a dynamic domain name server.

7. A group of object servers configured for workload management wherein said group exports an object reference to clients that may want to call the group in order to perform some work, said object reference having a field which points to a workload management unit which performs workload management among said group at the Internet Protocol (IP) level.

8. The group of object servers of claim 7, wherein said object reference has a hostname field which contains the name or IP address of an IP router.

9. The group of object servers of claim 7, wherein said object reference has a hostname field which contains an identifier identifying said group of servers.

10. The group of object servers of claim 7, wherein said workload management unit is a dynamic domain name server.

11. A computer program product stored on a computer readable storage medium for, when run on a computer, carrying out a method of performing workload management amongst a group of object servers within an object-oriented client/server computing environment, said method including steps of:

receiving a client request;

accessing a pointer previously exported by the group of servers, said pointer pointing to a workload management unit;

performing workload management using said workload management unit on said client request in order to select which server of said group should be used to satisfy the request, said workload management taking place at the Internet Protocol (IP) level; and forwarding said client request to the selected server.

12. An apparatus for performing workload management amongst a group of object servers within an object-oriented client/server computing environment, said apparatus comprising:

means for receiving a client request;

means for accessing a pointer previously exported by the group of servers, said pointer pointing to a workload management unit;

means for performing workload management using said workload management unit on said client request in order to select which server of said group should be used to satisfy the request, said workload management taking place at the Internet Protocol (IP) level; and means for forwarding said client request to the selected server.

* * * * *